United States Patent [19]

Enever

[11] 3,943,090

[45] Mar. 9, 1976

[54] CARBON FIBRE COMPOSITES

[75] Inventor: James A. Enever, Loughborough, England

[73] Assignee: British Railways Board, London, England

[22] Filed: June 28, 1972

[21] Appl. No.: 266,873

[52] U.S. Cl............................ 260/37 EP; 260/37 N
[51] Int. Cl.² ................. C08L 63/00; C08L 75/00
[58] Field of Search .......... 260/37 EP, 37 N, 830 P, 260/37 R, 37 CB, 37 M, 40 R, 39 M, 38, 42.22, 42.24, 37 SB; 117/72, 100 C

[56] References Cited
UNITED STATES PATENTS

| | | | |
|---|---|---|---|
| 3,402,064 | 9/1968 | Marzocchi | 117/72 |
| 3,473,950 | 10/1969 | Wong | 117/72 X |
| 3,663,652 | 5/1972 | Cannon et al. | 260/830 P |
| 3,686,359 | 8/1972 | Soldatos et al. | 260/37 EP X |
| 3,868,359 | 8/1972 | Soldatos et al. | 260/173 |

Primary Examiner—Lewis T. Jacobs
Attorney, Agent, or Firm—Fred Philipitt

[57] ABSTRACT

A method of forming a composite of carbon fibres and synthetic plastics material by embodying the fibres in a matrix of the synthetic plastics material. In the interfacial region of the carbon fibres and synthetic plastics material an elastomeric resin is provided which is compatible with the synthetic plastics material used for the matrix to minimise the tendency for cracks to initiate at the interface.

2 Claims, No Drawings

CARBON FIBRE COMPOSITES

This invention relates to methods of forming composites of carbon fibres and synthetic plastics materials by embodying the carbon fibres in a matrix of the synthetic plastics material and to composites formed by such methods.

The object of this invention is to provide a method of producing a composite which minimises the tendency for cracks to initiate at the interface of the carbon fibres and the synthetic plastics material.

According to the present invention the method includes providing in the interfacial region of the carbon fibres and synthetic plastics material an elastomeric resin which is compatible with the synthetic plastics material used for the matrix (i.e. the continuous phase).

The elastomeric material may be applied to the carbon fibres, for example by sizing, prior to the embodiment of the carbon fibres into the synthetic plastics material. Alternatively or additionally the elastomeric resin can be blended into the synthetic plastics material forming the matrix.

By the invention a more efficient distribution of stresses at the interface of the carbon fibres and the synthetic plastics material is obtained thus minimising the tendency for cracks to initiate. The fact that the elastomeric resin applied to the carbon fibres is compatible with the matrix resin will give rise to a gradual transition at the interface which again should enhance the toughness of the composite and hence improve its impact strength.

Suitable elastomeric resins for applying to the carbon fibres in order to produce a composite in the form of a prepreg are reactive urethane polymers with an appropriate curing agent: examples of suitable reactive urethane polymers are Adiprene L 167 and Adiprene BL-16 which are trade names of products manufactured by E. I. du Pont and de Nemours & Co. Inc. and examples of curing agents which can be used with them are diethylene triamine or 4,4 methylene bis (orthochloroaniline). Adiprene L-167 is a liquid urethane pre-polymer of toluene di-isocyanate and polytetramethylene glycol. Adiprene BL-16 is a liquid urethane pre-polymer of toluene diisocyanate and polytetramethylene glycol blocked with a ketoxime group.

To provide a blend of elastomeric resin with the matrix material a reactive urethane resin such as Adiprene L-167 can be blended with the epoxide component of a conventional rigid matrix system e.g. an epoxide such as that sold under the trade name Epikote 828 by the Shell Chemical Co. Ltd. and which is a condensate of epichlorhydrin and bisphenol A.

Several examples of carrying the invention into effect will now be described. All stated proportions of the components are by weight.

EXAMPLE 1

In this example the elastomeric resin for applying to the carbon fibres in the form of a size is a 1–30% solution of Adiprene BL-16 in acetone, containing 10–15 parts of diethylene triamine to 100 parts of Adiprene BL-16. Tows or sheets of carbon fibres are impregnated with the solution, excess solution is drained off and then the solvent removed by gentle heating, at 30°–40° under slight vacuum. The preferred concentrations of Adiprene BL-16 are 1 to 5% but higher concentrations can be used to apply a thicker layer of resin. The treated fibre can be now used to make a composite by impregnating it with a suitable matrix resin. Where it is desired the sized fibre can be converted into the form of a pre-impregnated composite or pre-preg prior to forming it into the final moulded composite, by treating it in known manner with a solution of a matrix resin suitable for forming a pre-preg, for example the Epikote DX-231/Epikure DX-125 system. The Epikote DX-231/Epikure DX-125 system is marketed by the Shell Chemical Company Ltd. Epikote DX-231 is a solvent solution of a mixture of diglycidyl ethers of diphenylol propane. Ekpkure DX-125 is a solvent solution of a cyanogen compound and a small proportion of an accelerator. If this latter system is used the curing should take place under pressure for 1½ hours at 150°C to form the prepreg.

EXAMPLE 2

The carbon fibres in tow or sheet form are sized with a 1–30% solution of Adiprene BL-16 in acetone containing 10–15 parts of diethylene triamine in the form of a salt with lactic acid. The use of diethylene triamine is desirable because the evidence is that its use gives a better bond to carbon fibres but, if desired, any other suitable curing agent for the urethane prepolymer of Adiprene BL-16 can be used, e.g. 4,4' methylene bis (orthochloroaniline). The excess solution is drained off and the acetone removed by heating to 30°–40°C under slight vacuum. The treated fibre can then be converted into a prepreg by impregnating it with a solution of a suitable matrix resin, for example the Epikote DX-210/Epikure $BF_3$-400 system. The Epikote DX-210/Epikure $BF_3$400 system is marketed by the Shell Company Ltd. Epikote DX-210 is a solution in methyl ethyl keton of a semi-solid resin which is a reaction product of a diglycidyl ether of diphenylolpropane and an aromatic amine. Epikure $BF_3$-400 is a boron trifluoride/monoethylamene complex. To form the prepreg curing is carried out in the usual way by heating for 1 hour under a pressure of 100 psi at 170°C and then postcuring for a further 3 hours at 170°C. The use of the lactic acid salt will not only permit the use of the boron trifluoride adduct but could also minimise degradation of the urethane. If increased extensibility of the urethane is required this can be achieved by adding to the urethane resin a suitable plasticiser such as dioctyl phthalate or dioctyl sebacate.

EXAMPLE 3

Carbon fibres in tow or sheet form are sized with a 4% solution of the polyurethane elastomer Adiprene BL-26 reacted with diethylene triamine and then treated with an epoxy resin such as Epikote DX-231/Epikure DX-125 to make a prepreg which is subsequently moulded to form the final composite. The advantages of coating the fibres in this way can be appreciated by comparing the properties of the resultant composite with those obtained from a composite formed from uncoated high strength carbon fibres (Young's modulus in the range 240–290 $GN/m^2$) and epoxy resin. The latter would give a composite having typically a flexural modulus of 140 $GN/m^2$. In comparison the composite produced from the coated carbon fibres in accordance with the example described above suffers no loss of flexural modulus. It suffers a slight drop in inter-laminer shear strength and some improvement in impact strength as measured by the Charpy test. Most significantly however the mode of failure in flexure changes from brittle to tough and at least twice as much energy is absorbed before complete failure occurs.

In the case of cross-plied laminates produced by the technique, a marked improvement in resistance to a falling weight impact is obtained. A sample, dimensions 50 × 50 × 2.5 mm, produced from a conventional pre-preg failed at 8 Joules, but a sample of similar dimensions and fibre content made using the above technique retained 75% of its original stiffness in bending, measured diagonally, after an impact of 12 Joules.

EXAMPLE 4

A further extension of the gradation in matrix properties in the region of the interface between the carbon fibres and the matrix can be achieved by blending an elastomeric resin into the matrix resin. Thus, a system consisting of 70 parts of Adiprene L-167 30 parts of an epoxide resin Epikote 828 (a condensate of epichlorhydrin and bisphenol A), 28 parts of a curing agent, 4,4'-methylenebis (2 Chloroaniline) is used as the matrix resin into which carbon fibres are impregnated to produced composite. The properties of the composite as compared with those of a standard composite of carbon fibre and an epoxy resin shows a 20% drop in flexural modulus, a 50% drop in interlaminar shear strength, but a 300% increase in impact strength (as measured by the Charpy test) and five times as much energy absorbed before failure in bending.

I claim:

1. A method of forming a composite of carbon fibers and synthetic plastics material by embodying the fibers in a matrix of an epoxy resin material and including the provision in the interfacial region of the carbon fibers and epoxy material of reactive urethane polymer which is compatible with the epoxy material.

2. A composite of carbon fibers embodied in a matrix of an epoxy resin material, the interfacial region between the carbon fibers and the epoxy resin material being composed of a reactive urethane polymer that is compatible with the epoxy resin material.

\* \* \* \* \*